US012331418B2

(12) United States Patent
Proshkin et al.

(10) Patent No.: US 12,331,418 B2
(45) Date of Patent: Jun. 17, 2025

(54) METHOD FOR LINING A CATHODE ASSEMBLY OF AN ELECTROLYSIS CELL FOR PRODUCING ALUMINUM

(71) Applicant: Obshchestvo S Ogranichennoy Otvetstvennost'yu "Obedinennaya Kompaniya Rusal Inzhenerno-Tekhnologicheskiy Tsentr", Krasnoyarsk (RU)

(72) Inventors: Aleksandr Vladimirovich Proshkin, Krasnoyarsk (RU); Andrej Gennad'evich Sbitnev, Krasnoyarsk (RU); Aleksej Sergeevich Zherdev, Krasnoyarsk (RU); Vitalij Valer'evich Pingin, Krasnoyarsk (RU); Anton Sergeevich Orlov, Krasnoyarsk (RU)

(73) Assignee: OBSCHESTVO S OGRANICHENNOY OTVETSTVENNOST'YU "OBEDINENNAYA KOMPANIYA RUSAL INZHENERNO— TEKHNOLOGICHESKIY TSENTR", Krasnoyarsk (RU)

( * ) Notice: Subject to any disclaimer, the term of this patent is extended or adjusted under 35 U.S.C. 154(b) by 232 days.

(21) Appl. No.: 18/038,670

(22) PCT Filed: Oct. 18, 2021

(86) PCT No.: PCT/RU2021/050344
§ 371 (c)(1),
(2) Date: May 24, 2023

(87) PCT Pub. No.: WO2022/114998
PCT Pub. Date: Jun. 2, 2022

(65) Prior Publication Data
US 2024/0011177 A1     Jan. 11, 2024

(30) Foreign Application Priority Data

Nov. 25, 2020   (RU) ................................ 2020138638

(51) Int. Cl.
  C25C 7/02          (2006.01)
  C25C 1/02          (2006.01)
(52) U.S. Cl.
  CPC .............. *C25C 7/025* (2013.01); *C25C 1/02* (2013.01)
(58) Field of Classification Search
  None
  See application file for complete search history.

(56) References Cited

U.S. PATENT DOCUMENTS

| 4,175,022 A | 11/1979 | Vadla et al. |
| 6,258,224 B1 | 7/2001 | Mirtchi |
| 2018/0223441 A1* | 8/2018 | Proshkin ................. C25C 3/085 |

FOREIGN PATENT DOCUMENTS

| CN | 1928161 A | 3/2002 |
| RU | 2553145 C1 | 6/2015 |

(Continued)

OTHER PUBLICATIONS

International Search Report and Written Opinion dated Dec. 16, 2021 with English translation in connection with International Application No. PCT/RU2021/050344, 6 pages.

*Primary Examiner* — Jacob T Minskey
*Assistant Examiner* — Adrianna N Konves
(74) *Attorney, Agent, or Firm* — Baker & McKenzie LLP

(57) ABSTRACT

The method includes: filling and levelling of a heat insulation layer on a cathode shell bottom; its coverage from above with a refractory layer; installation of the cathode bottom and side blocks with subsequent sealing of joints or seams between them with cold ramming paste and further monolithic baking; wherein: the levelled heat insulation layer is (Continued)

covered with a lower barrier layer of graphite foil placed between layers of fiberboard sheets; at least one refractory layer is formed; an upper barrier layer of graphite foil is placed between the layers of fiberboard sheets; all formed layers are simultaneously compacted to achieve alignment of the uppermost layer surface with a lower edge plane of the ports in the cathode shell; and the refractory layer of 20-30 mm thick is formed above the upper layer, according to some embodiments.

8 Claims, 5 Drawing Sheets

(56) References Cited

FOREIGN PATENT DOCUMENTS

| | | |
|---|---|---|
| RU | 2606374 C1 | 1/2017 |
| RU | 2667270 C1 | 9/2018 |

* cited by examiner

METHOD FOR LINING A CATHODE ASSEMBLY OF AN ELECTROLYSIS CELL FOR PRODUCING ALUMINUM

FIELD OF INVENTION

This disclosure refers to non-ferrous metallurgy, in particular to primary aluminum production, and can be used for lining cathode assemblies of aluminum electrolysis cells.

BACKGROUND

The aluminum reduction process is conducted in the operational space of cathode assemblies of aluminium electrolysis cells (or aluminum reduction cells, or simply pots), said space being enclosed by lining side blocks for protection against exposure to the environment—upper anode blocks and lower cathode bottom blocks. Cathode bottom blocks composing a bottom are placed on layers of lining barrier/refractory materials protecting against chemical and temperature effects on underlying lining heat-insulating materials, which are necessary to achieve the required electrolytic reduction temperatures in the cathode cavity. Lining side blocks, bottom blocks, and layers of refractory/heat-insulating materials are placed in a cathode shell, which is generally metallic. The cavity between the cathode blocks, as well as between them and side blocks is filled with carbon ramming paste followed by monolithic baking of the whole cathode structure.

An operational feature of reduction cells is penetration of bath components to the sub-cathode cavity located under the cathode bottom blocks, which is enclosed by the shell side walls at the cathode ends and by the bottom from below. This feature is conditioned by heterogeneity of the bottom blocks and lining materials. During long-term operation, this effect causes some changes and deformations, in particular, slow rise of the bottom. In addition to the shell deformation, this results in bending of cathode bars, higher electrical resistance of cathode blocks, their cracking, and subsequent need for disconnection of some pots for relining.

Penetration of molten bath to the pot lining occurs throughout the pot life, but most intensively—in the initial operation period of the cathode. When exposed to diffusion and capillary/gravity forces, both liquid and gaseous aggressive melt components (sodium, aluminum, fluorides) penetrate into lining materials and cause their degradation—deterioration of heat-insulating, structural, and chemical properties.

One of the basic reactions taking place in barrier materials is formation of albite $Na_2O*Al_2O_3*6SiO_2$ or nepheline $Na_2O*Al_2O_3 2SiO_2$ (upon surplus of fluorides):

$$6NaF+2Al_2O_3+3SiO_2=3NaAlSiO_4+Na_3AlF_6 \quad (1)$$

Over time, barrier materials are increasingly saturated with sodium fluoride causing formation of strong conglomerates. New coming NaF batches form salt lenses above barrier layers. The major components of these lenses are sodium fluoride, cryolite, and sodium aluminates. Formation of salt lenses between the bottom sole (lower surface) and upper surface of barrier (refractory) materials results in occurrence of vertical forces bending cathode blocks and tearing off cathode bars from cathode blocks. This process causes higher electrical resistance of cathode blocks and higher energy consumption for aluminum production. Subsequently, continuous thickness growth of salt lenses results in cracking of cathode blocks and emergency shutdown of reduction cells.

Spent lining materials with high contents of toxic water-soluble fluorides (up to 40% of the total waste weight) should be stored in specially equipped waste disposal areas inside dedicated concrete structures protecting wastes against penetration of atmospheric precipitation. This increases the waste storage cost, not yet solving the main problem—elimination of the environment pollution.

The toxic nature of spent pot lining materials is the main cause of environmental problems occurring in the aluminum industry. The main environmental impact is associated with significant quantities of water-soluble fluorides and cyanides. Washout products from spent lining disposal areas can pollute ground water or effluents. In addition, explosive gases are formed in layers of spent refractory materials kept in disposal areas as a result of oxidation by air and exposure to moisture.

There are various methods to improve the environmental safety of electrolytic aluminum production including those through reduction of fluoride quantities penetrating to the pot lining socle and eroding it, as well as through recycling of spent lining materials.

There is a well-known aluminum reduction cell's cathode assembly lining method (U.S. Pat. No. 4,411,758, Sep. 2, 1981) including: filling of granulated alumina or another heat-insulating material on the bottom; further placement of a high-temperature aluminosilicate fibrous material layer in form of boards or blankets; and filling of cuts in this material with granulated calcium-sodium broken glass with a relatively low melting point (<800° C.). An alumina layer is placed directly under the bottom blocks on the high-temperature aluminosilicate fibrous material layer. During operation, the glass-like material should be converted to nepheline $(Na_2O*Al_2O_3*2SiO_2)$ or albite $(Na_2O*Al_2O_3*6SiO_2)$ as a result of interaction with the high-temperature fibrous material.

Disadvantages of this lining method are incapability to recycle (reuse) spent materials and hazard related to deformation of the combined barrier layer with formation of cracks below the bottom block. In addition, presence of calcium in glass decreases the barrier compound temperature. In conjunction with continuous sodium input, this results in great reduction of the melting point and movement of the solidus isotherm: first to the heat insulation layer, and then (as the lining loses its heat-insulating properties) back right up to its entry to the bottom blocks. This causes crystallisation of salts there, which disintegrate the bottom blocks.

There is a well-known aluminum reduction cell's cathode assembly lining method (RU2608942, Jan. 26, 2017) including: filling of a heat insulation layer of non-graphitic carbon or its mix with an aluminosilicate or aluminous powder on the bottom; and placement of a refractory aluminosilicate powder on the heat insulation layer surface. At that, porosity of the heat insulation and refractory layers increases from the upper sublayer to the lower sublayer, while thickness ratio of the refractory and heat insulation layers is 1:(1-3). Non-graphitic carbon in the lower part of the cathode cavity keeps its initial properties and it can be reused.

A disadvantage of this lining method is sodium penetration to the upper heat insulation layers represented by non-graphitic carbon. This deteriorates their recycling properties due to occurrence of cyanides and formation of monolithic sodium carbonate pieces, which do not allow reusing them.

There is also a well-known method and a device for formation of one or more lining layers in an aluminum reduction cell's cathode assembly (RU2667270, Sep. 18, 2018) including: filling of one or more layers of at least one lining material on the cathode shell bottom with spreading of each layer on the cathode shell surface and levelling. This method is characterised in that the lining material layer is filled simultaneously with its spreading and levelling on the cathode shell surface using a tape-roller gate. At that, levelling is performed at the set level on the upper edge plane of the aluminum reduction cell's cathode assembly shell with sequential formation of one or more lining layers with similar or different set process physical and operating properties.

A disadvantage of this lining method is high gas permeability of heterogeneous lining materials conditioning sodium penetration to the lower heat insulation layers represented by non-graphitic carbon. This restricts their reuse, since undesirable compounds, such as monolithic sodium carbonate pieces and cyanides, are formed in them.

The aluminum reduction cell's cathode assembly lining method using a barrier made of thermally expanded graphite with a metal substrate (U.S. Pat. No. 4,175,022, Apr. 25, 1997), which is the closest method by technical substance to the claimed invention, includes: placement of heat insulation on the shell bottom and along its sides; spreading of alumina or another appropriate refractory powder on the heat insulation layer surface; placement of graphite foil with a metal substrate directly on the heat insulation layers and further placement of a refractory layer; installation of bottom/side blocks followed by closure of joints between them with cold ramming paste and monolithic baking. Graphite foil perfectly protects against migration of cryolite, its decomposition products, and other aggressive bath components, except for sodium. Graphite foil can be used separately from sheet steel, but it is more preferable to apply it with metal sheets used as a substrate. Metal sheets in this combination do not pass sodium, while foil protects the lower materials against other aggressive components.

A disadvantage of this lining method is that graphite foil with a metal substrate protects only the heat-insulating material layer. The upper refractory layer reacts with penetrating fluorides, which results in formation of strong conglomerates during demounting. These conglomerates should be safely stored, since there is no method for their further cost-effective use at present.

A disadvantage of foil use in cathodes with shaped lining materials is their very strong connection with the lower bricks probably conditioned by carbon diffusion. Upon cyclical temperature fluctuations, this results in occurrence of multiple cracks at boundaries of some bricks, which decreases efficiency of the foil barrier. When unshaped lining materials are used with their further compaction directly in the socle, mechanical damages of foil are inevitable. On the other hand, separate compaction of layers results in undercompaction of the upper refractory layers and overcompaction of the lower zones of the subcathode cavity. This causes growth of penetrating fluoride quantities in the upper layers of the subcathode cavity, increases total quantity of used initial lining materials, thereby increases quantity of generated wastes upon expiration of the pot life, and decreases weight of recyclable lining materials.

SUMMARY

This disclosure is based on the task to develop an aluminum reduction cell's cathode assembly lining method aimed at improvement of barrier properties of the cathode lining and capability to recycle spent lining materials in order to reduce the environment pollution as the final result.

The technical result, which can be achieved with the claimed technology, is less fluorides penetrating to a cathode socle and eroding it, as well as higher environmental safety of primary aluminum production thanks to less waste generation during aluminum production. These wastes are hazardous for the environment and subject to disposal after pot demounting. Waste reduction will give an economic effect— lower financial costs for purchase of new lining materials through their reuse and consequently lower production cost of aluminum. Application of recycling in electrolytic aluminum production solves to a great extent the environment protection problems.

DETAILED DESCRIPTION

Figure 1:
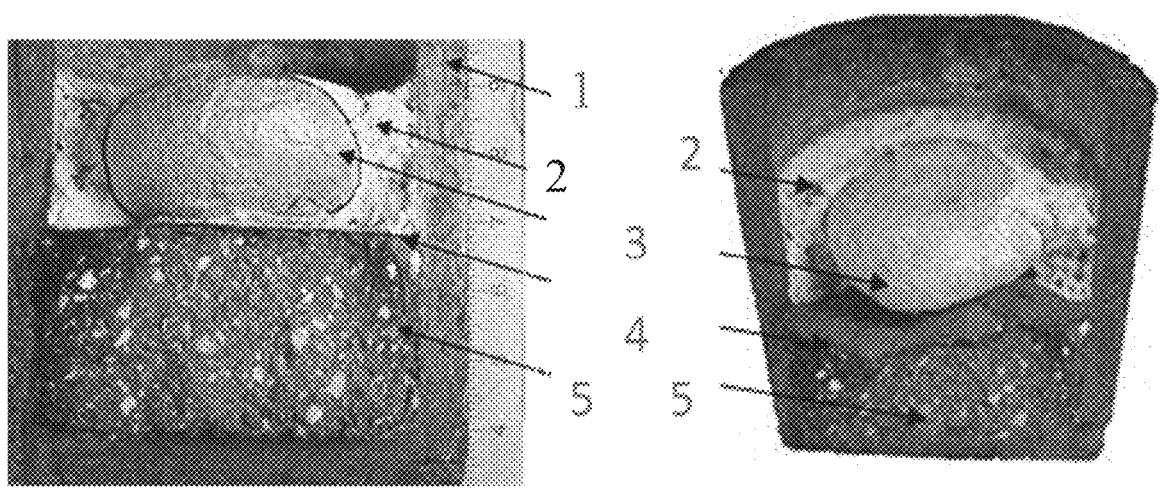
FIG. 1 shows appearance of a cell after 24-hour tests of graphite foil for chemical resistance to aggressive components—fluorides, aluminum, and sodium: left side—cross section, right side—3D image of the test cell, where 1—graphite crucible; 2—bath; 3—aluminum; 4—graphite foil; 5—fire clay brick.

The proposed aluminum reduction cell's cathode assembly lining method includes: formation of a heat insulation layer on the bottom; placement of the lower barrier layer of graphite foil cladded with layers of superhard fiberboards on the heat insulation layer; formation of at least one refractory layer above these layers; placement of the upper barrier layer of graphite foil cladded with layers of superhard fiberboards on this layer; further simultaneous compaction of all formed layers till alignment of the top surface of the upper fiberboard cladding layer with the lower edge plane of cathode collector bar ports; and formation of a levelling refractory layer up to 20-30 mm thick above the upper fiberboard cladding layer.

The innovation in the claimed lining method is that the barrier layer is made of graphite foil cladded with fiberboard layers, i.e. foil placed between superhard (with density of 950 kg/m$^3$ or higher) fiberboards. At that, there can be one or several refractory layers and these layers are also separated from each other with a barrier layer of graphite foil cladded with superhard fiberboards.

The proposed method is supplemented by specific embodiments being preferable in regards to achievement of the best technical result.

A gas impermeable layer can be obtained using seamless graphite foil with size corresponding to the cathode cross section.

For prevention of displacement in relation to each other, the lower and upper cladding sheets of superhard fiberboards can be butt-joined with gluing of joints using adhesive tape.

The heat insulation layer can comprise non-graphitic carbon or its mix with an aluminosilicate or aluminous powder.

Non-graphitic carbon, for example, can be carbon black, charcoal, wood dust, culm pyrolysis products, or partially carbonised lignite.

There can be one to three refractory layers, in addition to the levelling refractory layer, each of which is separated from the next one with a barrier layer of graphite foil cladded with superhard fiberboards.

The refractory layer can comprise refractory materials in the form of aluminosilicate powders or alumina.

Vibration compaction is performed to compact the material layer for resulting shrinkage of this layer to the required level. Vibration compaction in the claimed method is performed till alignment of the uppermost superhard fiberboard layer surface with the lower horizontal edge plane of collector bar ports.

Graphite foil in the claimed method is preferable with density of 1.26 g/cm$^3$ and thickness of 0.3 mm.

Cladding in the present disclosure means a structure for foil protection against mechanical damages, where the foil sheet is placed between fiberboard sheets.

Fiberboard is a sheet material produced through hot pressing or drying of a wood fibre mat with introduction of binders and special additives as necessary. There are some types of fiberboard materials from soft to superhard. Superhard fiberboards have density of 950 kg/m$^3$ or higher.

If fiberboard density is lower than claimed, fiberboard sheets can be damaged during handling. If fiberboard density is higher than claimed, fiberboard weight increases, which results in difficulties with cutting of sheets to match the cathode cavity size and during their handling.

According to research data, the optimum thickness of such fiberboard sheets should be 2-4 mm. If fiberboard thickness is less than specified, hardness of sheets decreases and they do not function as an intermediate elastic layer any more. This results in compaction of both upper refractory layers and lower heat insulation layers during compaction of the whole mass of lining materials causing lower heat resistance of the cathode. Since the heat insulation layer should have a low density in order to properly function as heat insulation, increase of its density results in deterioration of heat insulation properties. When thicker fiberboard sheets are used in the present disclosure, they become heavier and more expensive.

Collector bars for current supply are located in the lower grooves of the cathode blocks from their two sides and come out the cathode shell through the rectangular ports cut in the shell. The bars are secured in the cathode blocks during prior operations of cast iron pouring or contact paste ramming. At that, length of the cathode blocks with installed cathode bars appears to exceed the cathode width. A cathode block is generally inclined at 20-45° to its horizontal axis and one of collector bars is led to a port until the cathode block contacts the shell wall. After that, the second collector bar is lowered, directed to the opposite port, and positioned horizontally to obtain symmetry of the cathode block in the pot shell on surface of earlier installed refractory and heat-insulating lining materials. Therefore, both axes and upper/lower edges of the port should be located in parallel planes. The 'lower port edge means the lower horizontal plane of a rectangular port, where a collector bar is located.

Shrinkage of the uppermost superhard fiberboard layer surface till alignment with the plane of the lower edge of collector bar ports is performed intentionally. For that, the shell is filled with heat-insulating and refractory materials, which are sequentially poured and horizontally levelled, with further compaction/pressing and shrinkage of the whole material mass using the method and equipment, for example, described in patents RU2553145 (C1), 2015; U.S. Pat. No. 9,822,457, 2017; CN104937143, 2015; CA2,889,749, 2017. Compaction modes are selected so that shrinkage results in alignment of the upper refractory material plane with the plane, where lower horizontal port edges of the cathode shell are located.

After compaction and prior to installation of the cathode blocks, the upper refractory material surface is covered with a thin (20-30 mm) layer of the levelling refractory material so that the cathode bars do not contact the shell at their outlets from the shell and upper surfaces of the cathode blocks are located in the same horizontal plane after installation of the cathode bottom block (or simply cathode block).

The claimed method preferably uses seamless graphite foil with size corresponding to the cathode cross section area to obtain a gas impermeable barrier layer, while the lower and upper cladding sheets of superhard fiberboards are butt-joined with gluing of joints using adhesive tape for prevention of displacement in relation to each other.

According to the Darcy law, the driving force of molten fluoride penetration to the sub-cathode cavity is pressure gradient in height of the bottom block:

$$q = -\frac{k}{\mu}\frac{dP}{dx} \qquad (2)$$

Where: q—volumetric flow rate of molten fluorides through cross section S, m$^3$/(m$^2$s); k—permeability factor, m$^2$; dP/dx—pressure gradient in height of the bottom block, Pa; µ—dynamic viscosity, Pa*s.

The permeability factor appearing in equation (2) depends on size/quantity of pores and it can be estimated by the following structural parameters: open porosity ratio, pore size distribution, and pore sinuosity factor. For porous materials with uniformly spread and non-intercrossing pores as cylindrical channels of small section, the permeability factor can be calculated by the formula:

$$k = PT\frac{d^2}{32} \qquad (3)$$

Where: P—porosity; d—pore size, m; k—permeability factor.

As it follows from the given formulas, the permeability factor and consequentially quantity of penetrating bath components decrease in quadratic dependence as the pore size decreases.

Since barrier lining materials including graphite foil are heterogeneous structures with different pore size distribution patterns, i.e. dependences of quantity (volume, weight) of particles/pores on their size in the analysed material, the pore size range of such materials can be conditionally divided to three areas. For coarse pores (over 100 µm), pressure gradient is mainly conditioned by hydrostatic and gravity forces. For finer channel pores, capillary forces appear along with the said forces. Due to potential field energy of capillary forces, pressure gradient is much higher than for coarse pores and such capillaries are able to intensively absorb molten fluorides. With further decrease of pore size, pressure gradient conditioned by capillary forces increases, but hydraulic resistance to liquid flow rises much faster simultaneously and penetration of fluorides through such pores can be neglected. Therefore, materials with small pore size have higher barrier properties as well. Graphite foil belongs namely to such materials.

Foil placement above the refractory layer promotes increase of resistance to fluoride flow from the cathode blocks to the subcathode cavity. Therefore, pressure increases in the zone, which is enclosed by the barrier foil layer from below, by the sole/lower surface of the cathode bottom blocks from above, and by the side blocks from sides, due to inflow of molten fluorides. At that, pressure gradient decreases in height of the bottom block. According to the equation (2), this results in decrease of fluoride flow to the cathode socle eroding it and in decrease of waste generation after demounting of the cathode.

Foil cladding from above and from below with superhard fiberboards applied in the claimed method pursues three goals. The first goal is foil protection against mechanical damage by particles of unshaped lining materials. The second goal is provision of functional-gradient properties of the subcathode cavity—high density of the upper refractory layers and loose structure in the lower heat insulation layers. The third goal of foil cladding with superhard fiberboards lies in that fiberboards turn into carbon layers after their pyrolysis during the pot operation and thereby foil is additionally protected against oxidation, which is particularly important upon occurrence of emergency situations, such as run-out of oxygen-containing fluorides to the subcathode cavity.

The aluminum reduction cell's cathode assembly lining method comprises the following:
  a heat insulation layer of a lining material is formed on the cathode bottom (poured and levelled);
  sheets of superhard fiberboards are placed and butt-joined on the levelled layer surface, optionally with further gluing of joints using adhesive tape;
  a barrier layer tape of graphite foil is rolled out; at that, seamless graphite foil with size corresponding to the cathode cross section can be used to obtain a gas impermeable layer;
  sheets of superhard fiberboards are again placed and butt-joined on the barrier layer of graphite foil, optionally with further gluing of joints using adhesive tape;
  refractory layer of a lining material is poured and levelled on surface of the superhard fiberboards;
  depending on quantity of optional additional refractory layers, the above-described operations are repeated including placement of fiberboards, rolling out of a barrier layer tape of foil, and placement of fiberboards on it;
  all formed layers of the subcathode cavity are compacted to achieve alignment of the uppermost superhard fiberboard layer surface with the plane of the lower edge of the collector bar ports.
  After compaction of the subcathode cavity materials, a levelling layer of a refractory material 20-30 mm thick is placed on the compacted surface. This layer allows aligning the upper surfaces of the cathode blocks in the same plane and ensuring positioning of the cathode bars without their contact with the shell on the lower edge plane of the ports. At that, the levelling layer also performs another function—fast formation of a viscous layer inhibiting penetration of fluorides and sodium to the lower materials.

EMBODIMENT

The substance of the proposed cathode assembly lining method is illustrated by examples of the method specific implementation.

Figure 5:
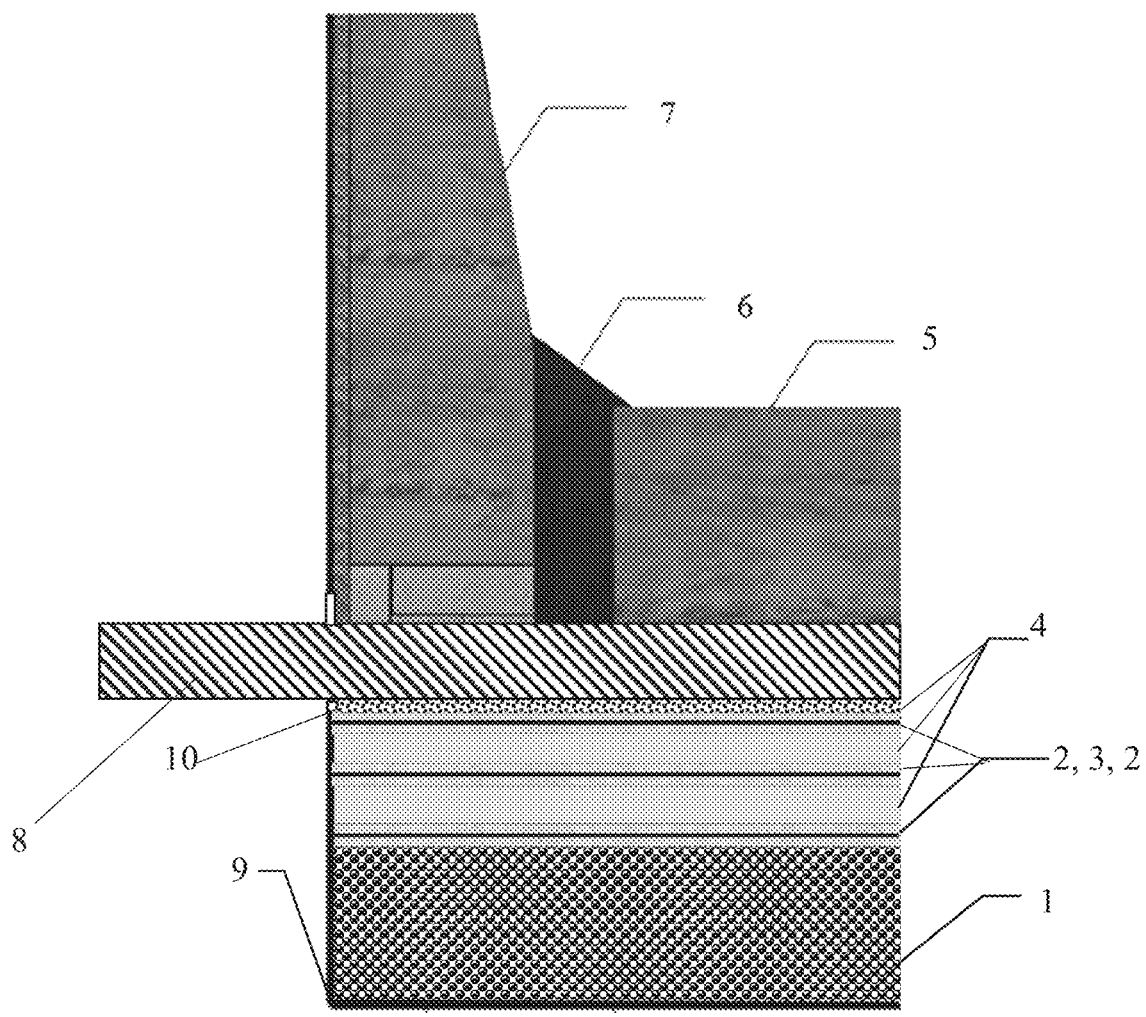
FIG. 5 shows the sketch of a cathode with layers of heat-insulating and refractory materials containing several barrier layers of graphite foil cladded with superhard fiberboards.
Figure 6:
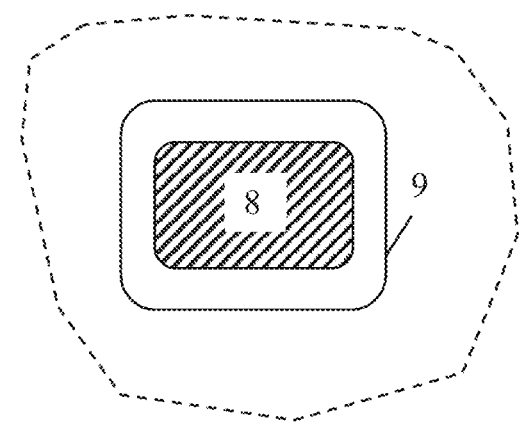
FIG. 6 shows the layout of a collector bar in a shell port (9) (side view).

The cathode structure (FIG. 5) provides for a formed heat insulation layer of non-graphitic carbon (1) on the bottom designed for further reuse. For that, this layer is covered from above with a barrier layer of graphite foil (3) cladded with layers of superhard fiberboards (2).

Thus, the heat insulation layer of non-graphitic carbon (1) is covered from above with the layer of superhard fiberboards (2) followed by the foil layer (3) also covered with the layer of superhard fiberboards (2). At least one refractory layer (4) is placed above the said layer (2) and also covered from above with a barrier layer of foil (3) cladded with layers of superhard fiberboards (2). The uppermost fiberboard layer (2) is covered with a levelling refractory layer (4) to align the upper surfaces of the cathode blocks in the same plane and to protect the cathode bars (8) against contact with the shell (9) at their outlets from the shell (9).

The barrier layer (3) is formed as follows. A foil roll is placed at the cathode end wall and rolled out approaching the opposite end wall, where the remaining material is cut.

There can be one or more combined refractory layers (4) in addition to the levelling refractory layer (4), for example, two or three layers. This depends on both technical and economic parameters of repair units and operating parameters of reduction cells. More combined refractory layers (4) reduce quantity of fluorides penetrating to the cathode socle, but implies additional costs for purchase of foil/fiberboards and labour costs for installation of barrier layers (3). With respect to a cathode assembly, installation of additional barrier layers (3) increases relining duration, which results in reduction of aluminum output.

The refractory layer (4) with high density and cryolite resistance is designed for formation of viscous glass to inhibit penetration of the bath liquid phase to the cathode lower part. This layer (4) actively reacts with sodium and decreases formation intensity of cyanides in the lower heat insulation layer (1).

Elastic tape (cover) is rolled out on the upper barrier layer of graphite foil (3) located between the layers of superhard fiberboards (2) and all formed layers of the subcathode cavity are compacted using a vibrating compactor to achieve alignment of the uppermost superhard fiberboard layer (2) surface with the plane of the lower edge (10) of the collector bar ports (8).

The cathode bottom blocks (5) (or simply cathode blocks) are installed on the compacted socle of heat insulation (1) and refractory (4) layers placed as described above and joined using carbon ramming paste (6) with the side blocks (7). The cathode bars (8) are installed in grooves of the cathode blocks (5) and secured with cast iron pouring. The whole lining structure is located in the cathode shell (9).

Graphite foil was tested under laboratory conditions to estimate its barrier properties. Tests were carried out on Graphlex GF-1V-1.3 03×150×1740 graphite foil produced as per TU 5728-040-13267785-05 with density of 1.26 g/cm3 and thickness of 0.3 mm. Properties of the tested foil are given in Table 1.

TABLE 1

Properties of graphite foil

| # | Property | Value | Unit |
|---|---|---|---|
| 1 | Gas permeability (nitrogen) | $2*10^{-6}$ | $cm^3*cm/cm^2*s*atm$ |
| 2 | Tensile strength | 3-7 | MPa |
| 3 | Heat conduction | | W/(mK) |
|   | lengthwise | 130-200 | |
|   | crosswise | 3-5 | |
| 4 | Electrical conduction lengthwise | 1-1.25 | $Ohm^{-1}*m^{-1}*10^5$ |
| 5 | Fire hazard | | Incombustible, non-explosive, flame-retardant |

Foil was tested for chemical resistance to combined action of aluminum, sodium, and bath with A. Tabereaux method using the unit described in the publication: 'Tests of Barrier Materials for Cryolite Resistance: Method and Operational Experience./I. Patrakhin, A. Pogodaev, A. Proshkin, P. Polyakov et al./—In collected book 'Aluminium of Siberia', 2005, p. 331-338.

The laboratory tests of foil were carried out using graphite crucibles, where specimens of conventional lining materials were placed, such as fire clay bricks. At that, graphite foil of the necessary diameter was placed above a brick specimen premachined at a lathe for the graphite barrel size. Foil joints were thoroughly aligned to the barrel walls. The tests were carried out for both 24 hours and 48 hours.

The laboratory test results (FIG. 1) showed that graphite foil was well preserved and it stopped penetration of bath and aluminum to the brick specimen. Bath kept its light colour and there were no signs of aluminum carbide formation. Longer tests for 48 hours showed that the results were identical to those of the 24-hour tests. Thus, graphite foil prevented penetration of molten fluorides, aluminum, and partially sodium to the lower brick specimen.

Further industrial tests of 21 reduction cells with foil placed above the heat insulation layer confirmed efficiency of its application as a barrier layer of foil cladded with superhard fiberboards. As compared to reference (typical) reduction cells, which are commonly used for aluminum production, the pilot reduction cells showed lower consumption of aluminum fluoride $AlF_3$ in the electrolytic reduction process.

Figure 2:
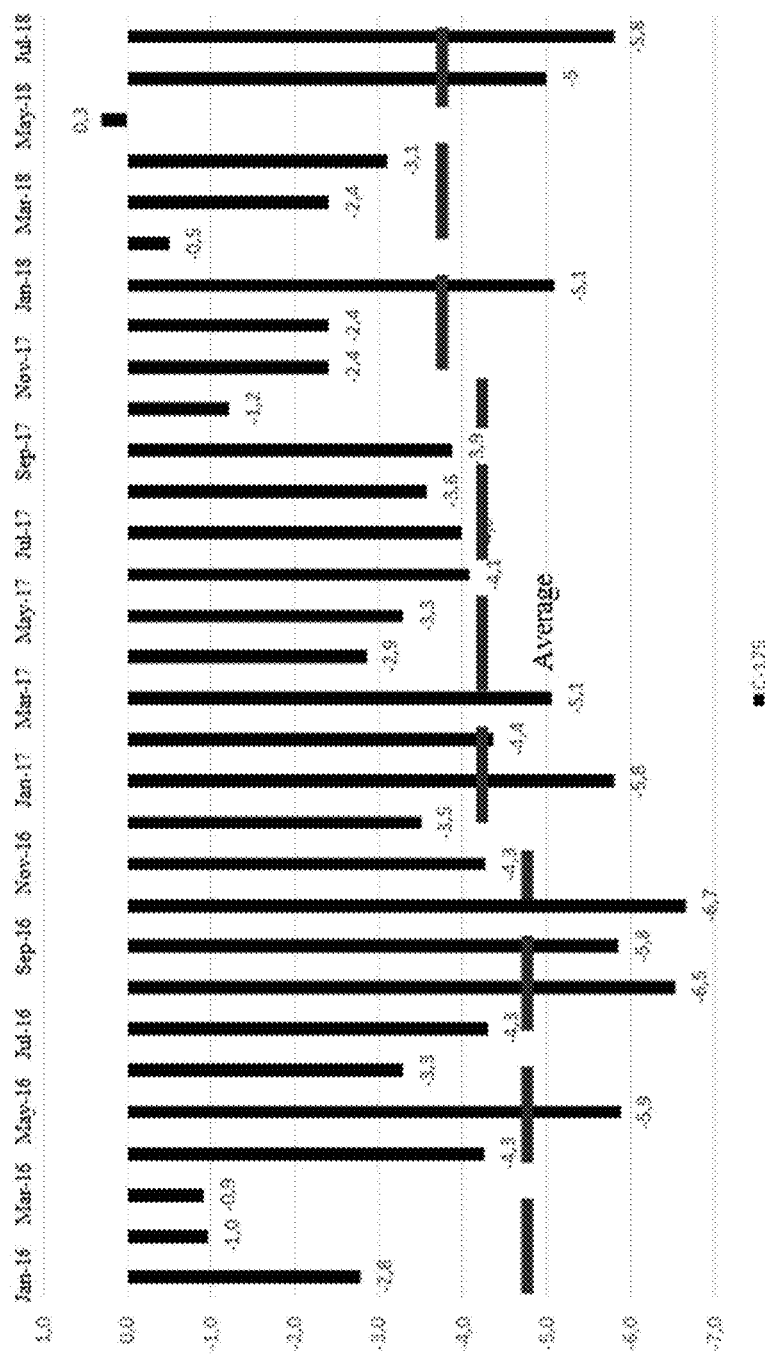
FIG. 2 shows the diagram of dynamic changes in aluminum fluoride consumption difference between typical and pilot reduction cells using graphite foil.

So, difference in $AlF_3$ consumption between the pilot and reference reduction cells for more than 3 years of observations remained always positive (FIG. 2). At that, the difference was most pronounced in the initial operation period of the reduction cells and it reached 20%. As materials in the sub-cathode cavity were saturated with fluorides, the difference in aluminum fluoride consumption between the pilot and reference reduction cells was smoothed over.

Installation of an additional barrier layer of foil (3) cladded with layers of fiberboards (2) in the upper part of the subcathode cavity directly on the refractory layer (4) allowed yet more reduction of fluoride consumption. So, comparison of daily consumption rates of aluminum fluoride between reduction cells with one and two foil layers showed the average annual reduction of aluminum fluoride consumption at 46.2% for the reduction cells with two barrier foil layers. If three additional barrier layers are applied between refractory layers, reduction of aluminum fluoride consumption can exceed 60%.

Figure 3:
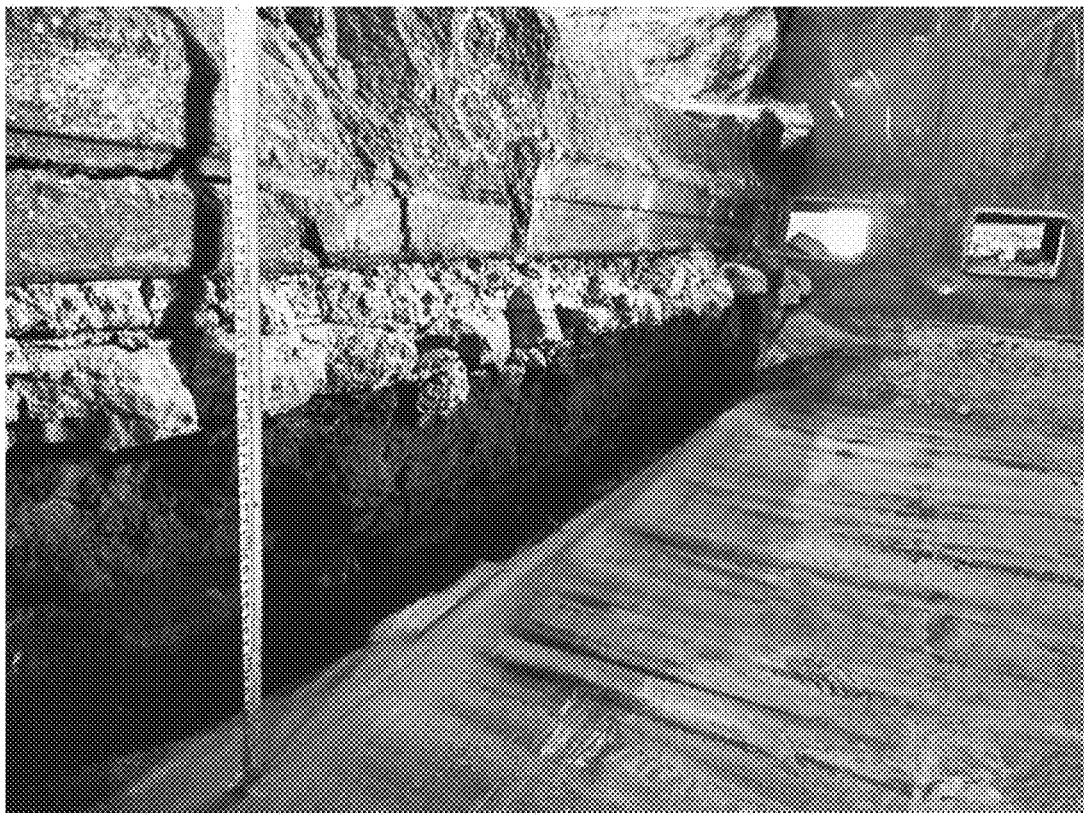
FIG. 3 shows the cross section view of a cathode with graphite foil and unshaped lining materials after operation during about 2400 days.

Examinations of various lining materials performed during autopsy of a reduction cell operated for about 80 months (FIG. 3) with a barrier layer of graphite foil showed that consumption of fluorides was reduced and contents of cyanides/sodium carbonates were reduced in the heat insulation layer of non-graphitic carbon or its mix with an aluminosilicate or aluminous powder, which allowed reuse of these lining materials.

Figure 4:
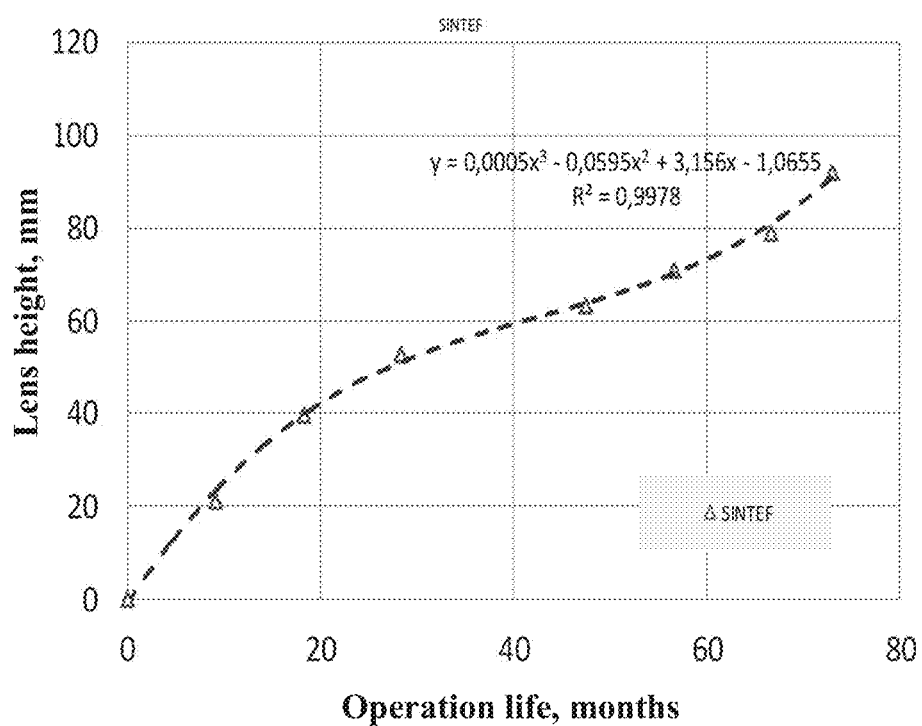
FIG. 4 shows the diagram of dynamic changes in fluoride lens thickness over time according to data of SINTEF (a laboratory in Norway researching processes in cathodes).

So, thickness of a lens formed directly under a cathode block was just 45-65 mm, which was significantly less than about 100 mm reached in cathodes not using foil cladded with fiberboards with the same operation life according to data of SINTEF laboratory (FIG. 4). As for cyanides, their concentration after foil application was just some ppm.

Thus, the claimed lining method allows less waste generation during cathode demounting and better environmental safety of primary aluminum production.

Industrial tests of the claimed lining method for one barrier layer of graphite foil showed the following positive results. During operation of a reduction cell with the lining structure using graphite foil cladded with superhard fiberboards above a refractory layer, consumption of aluminum fluoride was reduced by 2.1 kg per tonne of aluminum. Height of a lens in the cathode operated for more than 80 months appeared to be almost twice lower than in the reference reduction cells. At that, contents of cyanides in the lower layers of non-graphitic carbon appeared to be vanishingly low.

According to some embodiments of this disclosure, a method for lining a cathode assembly of an electrolytic cell for aluminum production is provided. The method comprises filling and levelling of a heat insulation layer (1) on a bottom of a cathode shell (9) of the cathode assembly. The method also includes filling a refractory layer (4) on top of the insulation layer and installing cathode blocks (5) and side blocks (7) with subsequent sealing of seams (6) between the cathode blocks (5) and between the side blocks (7) with a cold ramming paste and subsequent monolithic baking. It is appreciated that the levelled heat insulation layer (1), according to some implementations, is covered with a lower barrier layer of graphite foil (3) placed between layers of fiberboard sheets (2) with density of 950 kg/m³ or higher. It is further appreciated that at least one refractory layer (4) is formed and an upper barrier layer of graphite foil (3) placed between the layers of fiberboard sheets (2) with density of 950 kg/m³ or higher is installed, according to some embodiments, under the cathode blocks such that the cathode blocks are installed on the levelling layer. Furthermore, all formed layers (1, 2, 3, 4) are simultaneously compacted to achieve alignment of an upper surface of an uppermost layer of the fiberboard sheets (2) with a plane of a lower edge (10) of cathode collector bar ports (8) in the cathode shell (9) such that a levelling refractory layer (4) of 20-30 mm thick is formed above the uppermost layer of the fiberboard sheets (2).

These and other implementation may include the following features. A seamless graphite foil with dimensions corresponding to a cross-section of the cathode assembly is used, according to some embodiments, to cover one or more areas of the cathode assembly or the entire area around the cathode assembly. The layers of the fiberboard sheets (2) may be butt-joined or joined end-to-end such that joints formed are glued using an adhesive tape. Moreover, the levelled heat insulation layer (1) may comprise: non-graphitic carbon, a mixture of non-graphitic carbon and an aluminosilicate powder, or a mixture of non-graphitic carbon and an aluminous powder. The one or more of soot, charcoal, sawdust, pyrolysis products of cereal plant stems, or partially carbonised lignite may be used as the non-graphitic carbon. In addition, a number of the refractory layers (4) exclusive of the levelling refractory layer(s) (4) may be from 1-3 such that a barrier layer of graphite foil (3)

placed between the layers of fiberboard sheets (2) with density of 950 kg/m³ or higher is placed between the refractory layers (4). It is appreciated that the refractory layer (4) may comprise refractory materials in a form of aluminosilicate powders or alumina. The graphite foil with density of 1.26 g/cm³ and thickness of 0.3 mm may be used, according to some embodiments, to prevent the penetration of aggressive components into the lower part of the cathode assembly.

Application of the above-described reduction cell's cathode assembly lining method with two barrier layers (first—at the boundary of the refractory and heat insulation layers, second—above the refractory layer) will allow the total economic effect at least $2700 per reduction cell annually through reduction of aluminum fluoride consumption by 4 kg/t Al ($5/t Al), reduction of extracted socle wastes by 20.4 tons, and reduction of costs for storage of spent lining materials thanks to their reuse and refusal of purchasing new lining materials. Installation of the third refractory layer with the barrier layer cladded with fiberboard sheets will additionally reduce fluoride consumption (according to our estimates by 20%) and quantity of wastes. More barrier layers of graphite foil cladded with superhard fiberboards will give more reduction of fluoride consumption. However, taking into account costs for additional barrier layers, the economically feasible option is lining containing one to three barrier layers.

The invention claimed is:

1. A method for lining a cathode assembly of an electrolytic cell for aluminum production including:
   filling and levelling of a heat insulation layer (1) on a bottom of a cathode shell (9) of the cathode assembly;
   filling a refractory layer (4) on top of the insulation layer;
   installing cathode blocks (5) and side blocks (7) with subsequent sealing of seams (6) between the cathode blocks (5) and between the side blocks (7) with a cold ramming paste and subsequent monolithic baking,
   wherein:
   the levelled heat insulation layer (1) is covered with a lower barrier layer of graphite foil (3) placed between layers of fiberboard sheets (2) with density of 950 kg/m³ or higher;
   at least one refractory layer (4) is formed;
   an upper barrier layer of graphite foil (3) placed between the layers of fiberboard sheets (2) with density of 950 kg/m³ or higher is installed;
   all formed layers (1, 2, 3, 4) are simultaneously compacted to achieve alignment of an upper surface of an uppermost layer of the fiberboard sheets (2) with a plane of a lower edge (10) of cathode collector bar ports (8) in the cathode shell (9) and
   a levelling refractory layer (4) of 20-30 mm thick is formed above the uppermost layer of the fiberboard sheets (2).

2. The method of claim 1, wherein a seamless graphite foil with dimensions corresponding to a cross-section of the cathode assembly is used.

3. The method of claim 1, wherein the layers of the fiberboard sheets (2) are butt-joined or joined end-to-end such that joints formed are glued using an adhesive tape.

4. The method of claim 1, wherein the levelled heat insulation layer (1) comprises:
   non-graphitic carbon,
   a mixture of non-graphitic carbon and an aluminosilicate powder, or
   a mixture of non-graphitic carbon and an aluminous powder.

5. The method of claim 4, wherein one or more of soot, charcoal, sawdust, pyrolysis products of cereal plant stems, or partially carbonised lignite are used as the non-graphitic carbon.

6. The method of claim 1, wherein a number of the refractory layers (4) exclusive of thea levelling refractory layer (4) is from 1-3 wherein a barrier layer of graphite foil (3) placed between the layers of fiberboard sheets (2) with density of 950 kg/m³ or higher is placed between the refractory layers (4).

7. The method of claim 1, wherein the refractory layer (4) comprises refractory materials in a form of aluminosilicate powders or alumina.

8. The method of claim 1, wherein graphite foil with density of 1.26 g/cm³ and thickness of 0.3 mm is used.

* * * * *